United States Patent [19]
Masselle

[11] 4,015,342
[45] Apr. 5, 1977

[54] FLEXIBLE VISUAL DISPLAY SYSTEM
[75] Inventor: Francis L. Masselle, Hallstead, Pa.
[73] Assignee: The Singer Company, Binghamton, N.Y.
[22] Filed: May 7, 1973
[21] Appl. No.: 357,947
[52] U.S. Cl. .................................. 35/12 N; 352/132
[51] Int. Cl.² .......................................... G09B 9/08
[58] Field of Search .......... 35/11, 12 K, 12 N, 9 A, 35/8 R; 352/37, 163, 132

[56] References Cited
UNITED STATES PATENTS

| | | | |
|---|---|---|---|
| 2,590,956 | 4/1952 | Gille | 343/6 |
| 3,408,749 | 11/1968 | Brudner | 35/9 A |
| 3,565,521 | 2/1971 | Butler et al. | 352/163 |
| 3,574,262 | 4/1971 | Bowker | 35/12 N |
| 3,613,262 | 10/1971 | Feder | 35/8 R |

Primary Examiner—Richard C. Pinkham
Assistant Examiner—Vance Y. Hum
Attorney, Agent, or Firm—James F. Duffy; James C. Kesterson

[57] ABSTRACT

A cinematographic film system which employs film having a motion picture sequence recorded thereon with at least one intervening frame between recorded frames. A second motion picture sequence is recorded on uniformly spaced intervening frames. The film is projected using a film transport operating to advance the film in multiple frame steps equal to the spacing of the frames in said motion picture sequences. The film transport is adjustable to permit, on signal, a single one-frame advance and thus shift the film from one to the other of said motion picture sequences. In a vehicle simulator, the film and projector coact to impart considerable flexibility to film-based visual display systems.

5 Claims, 3 Drawing Figures

FLEXIBLE VISUAL DISPLAY SYSTEM

BACKGROUND OF THE INVENTION

1. Field of the Invention

This invention relates generally to cinematographic projection systems and in particular to the utilization of such systems in conjunction with vehicle simulators to provide a realistic environmental scene for training purposes.

2. Description of the Prior Art

While the invention is applicable to simulators of any manner of vehicle, it will be described herein for the purposes of example in conjunction with an aircraft flight simulator which is believed at this time to be its principal field of utility and importance.

In aircraft flight simulators and similar training devices, it is often necessary to provide a visual system for presenting to the operator (trainee) a realistic scene representing an environment appropriate to the position, condition, altitude, etc., of the simulated aircraft at any given moment. Various types of visual systems have been developed including one known as a "camera-model," which utilizes closed-circuit television (CCTV) and a two- or three-dimensional terrain model. The TV camera and an optical pickup or "probe" are mounted for displacement in six degrees of freedom and positioned to generate an aerial view of the terrain model. The position and altitude of the camera/probe unit is controlled in response to manipulation of the simulator controls and the resulting scene is displayed to the trainee with a CRT. Thus, in effect, the camera/probe "flies" over the model terrain, representing the eyepoint of the simulator pilot and displays for him the scene which he would view through the windshield if his simulator were a real aircraft flying over real terrain. For additional information on camera-model visual systems reference may be had to U.S. Pat. Nos. 2,979,832 and 3,422,207.

Camera-model visual systems have a number of drawbacks, perhaps the most important one of which is the limited brightness and resolution of the TV display together with the presence of raster lines which detract from its realism. And, of course, the better the resolution, the more realistic the model must be if it is to appear life-like in the display, and the more realistic the model, the higher its cost and the more difficult its maintenance. In addition, a terrain model of suitable scale can be accommodated only in an extraordinarily large room or a specially designed building.

These and other disadvantages of camera-model visual systems are avoided by using motion picture film as the image source. The film is made with a forward-looking cine camera mounted in an aircraft which flies a planned mission over the desired terrain, making landings and take-offs at an actual airport of choice while following, as closely as possible, an ideal flight profile. The film thus obtained is projected for the trainee in the simulator through a servo-controlled anamorphic optical system responding to simulator control movements to distort the images so as to effect an apparent change in the viewpoint of the trainee corresponding to that which would occur in the out-of-the windshield view from a real aircraft in response to the same control movements. Visual systems of this type are commercially available under the trademark VAMP from The Singer Company and are more fully described in a group of U.S. patents typified by U.S. Pat. No. 2,999,322 granted to H. S. Hemstreet.

While the VAMP visual system is far superior in realism and most other respects in comparison to camera-model types, it is restricted in one important aspect insofar as some training applications are concerned. Because the scene to be displayed is recorded on film, no departure from the image content of the film is possible. Thus, for example, if the film depicts the scene through the windshield of an aircraft as it makes its final landing approach, flares, touches down and rolls out along the runway, this is the scene which must inevitably be displayed to the simulator pilot even if he should decide that he had missed his approach and rejects the landing. The VAMP visual system effects apparent perspective displacement by use of anamorphic distortion; while this permits substantial deviations both laterally and in altitude from the scene as recorded on the film, it is nevertheless incapable of a total departure from that scene. Accordingly, it is sometimes referred to as a pre-programmed system.

Pre-programming is not a characteristic of the VAMP visual simulator only but is inherent in any system which utilizes cinematographic film for image generation and, while the limitations it imposes have long been recognized, attempts to overcome them have been only partially successful if at all.

One solution, of course, lies in the resort to image generation not utilizing film. The camera-model system, already described, utilizes a terrain model to avoid the inflexibility of a film-based image generator but at the price of other shortcomings of a more serious nature also described above.

The utilization of digital computer image generator (CIG) visual systems (as shown in U.S. Pat. No. 3,621,214, for example) is a comparatively recent development which avoids the use of film but these are characterized by very high cost due to the need for extremely high speed computation and vast memory capacity. Moreover, at the present time, the display achievable is inferior even to that of a camera-model system in that it has the disadvantages of any system using a CRT display, viz, raster lines, limited brightness, etc., and in addition, in their current stage of development, CIG systems present a display which is somewhat more symbolic than realistic in appearance.

Attempts to introduce greater flexibility into film-based visual systems have proposed the subdivision of the frames of cine film into multiple zones as shown in U.S. Pat. Nos. 3,574,262 and 3,580,978. This necessarily compromises one of the major advantages of film-based systems by effectively reducing the frame size and, therefore, the resolution of the display. (The importance of large frame size in applications of this type is attested by the fact that the commercial VAMP visual system, mentioned above, utilizes 65/70mm film.)

It is, therefore, a principal general object of the invention to improve film-based visual systems by overcoming or at least mitigating the disadvantages described above.

A more specific object is to increase the flexibility of film-based image generation systems without sacrifice of image quality.

Another object is the provision of a novel, film-based simulator visual system having greater latitude in display variability than comparable prior art systems.

SUMMARY OF THE INVENTION

To the accomplishment of the foregoing and other objects, the invention contemplates a visual simulation system for vehicle trainers including a cine projector having a film transport adjustable to advance film in increments of a single or multiple frames and further including means for selectively switching the film transport between single and multiple frame film advance operation of the projector. The system employs cine film carrying a first motion picture sequence recorded on selected frames uniformly spaced from each other by at least one intermediate frame and a second motion picture sequence recorded on intermediate frames spaced from one another by the same number of frames as the selected frames. Thus by causing the film transport to operate with a multiple frame advance corresponding to the spacing of the frames of each motion picture sequence, the sequence displayed can be changed from the first to the second and vice versa by causing the transport to make one advance increment which is at least one frame less than that of the spacing between frames of the respective motion picture sequences.

DESCRIPTION OF THE PREFERRED EMBODIMENT

Figure 1:
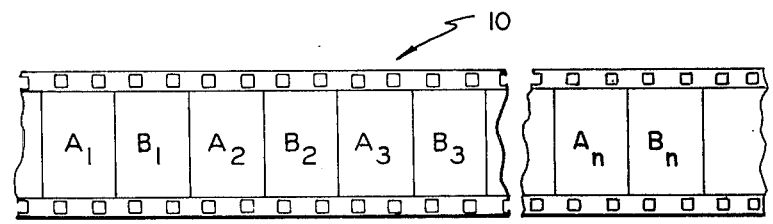
FIG. 1 is a fragmentary view of a cine film strip embodying the present invention.

The invention is most easily described and understood with reference to the cine film utilized in a simulator visual system in which it may be embodied and, accordingly, the film will be first described, with continuing reference to FIG. 1.

The cine film strip shown in FIG. 1 and designated 10 is, in its physical configuration and photographic properties, entirely conventional and standard commercially available film. Thus, for example, it may be 35mm or, preferably for simulator applications, 70mm sprocketed film. Film strip 10 is unique in the manner in which the images making up motion picture sequences are recorded thereon.

As is well-known cine film normally has a series of contiguous frames each bearing an image slightly, and usually progressively, different from adjacent frames so that, when projected in a rapid sequence, the illusion of motion is created. Consequently, such a series of contiguous frames, related in the manner described, may be considered and will hereinafter be referred to as a motion picture sequence.

In accordance with the present invention, a motion picture sequence is recorded on the standard cine film using frames which are spaced from each other, uniformly, by a distance equivalent to at least one frame length. In FIG. 1, the frames making up the motion picture sequence are designated A, with subscript numerals to show the serial relation, i.e., $A_1, A_2, A_3 \ldots A_n$. In the embodiment disclosed, frames of the series $A_1, A_2$, etc., are spaced by one frame length, i.e., there is one intervening frame between each pair of consecutive frames of the A series but, as will be appreciated as this description proceeds, there may be two or more intervening frames.

The intervening frames in FIG. 1 are designated $B_1, B_2, B_3 \ldots B_n$ and constitute a second motion picture sequence which is significantly different from albeit usually related to the sequence $A_1 \ldots A_n$.

From the foregoing description it will be seen that, by exhibiting film strip 10 in a projector which advances the film two frames at a time (in the terms of the art, the pull-down is equal to two frame lengths) one or the other sequence will be shown, $A_1 \ldots A_n$ if the initial frame is of the A series, $B_1 \ldots B_n$ if of the B series. Projectors obviously can be designed to have the necessary pull-down but, for the purposes of the invention, a projector having an adjustable pull-down is required as, for example, the projector described in U.S. Pat. No. 3,565,521 to L. W. Butler et al.

For high speed pull-down and flexibility in the film transport some projectors, including the Butler projector, utilize a sprocket wheel intermittently rotated by a torque motor or the like instead of the more conventional claw-type mechanism to effect film advance. Freed of the mechanical restraints of a claw-type pull-down, the pull-down in a motor driven sprocket-type advance is easily varied by varying the extent of motor rotation in each increment. Thus, a 90° or ¼ revolution can be used for a single frame advance, a 180° or ½ revolution for double frame, etc. A shutter in the projector optical system obturates the image path while the film is in motion. Transports of this type, sometimes referred to as pulse pull-down transports, achieve incremental advance of the film at speeds ranging from below to far above the customary 24 frames per second which is standard in commercial motion pictures. Such transports are entirely satisfactory for use with film as exemplified by film strip 10 without perceptible flicker.

Film as shown in FIG. 1 can be exposed using a conventional cinematographic camera modified to have the desired pull-down, viz, two frames at a time. This yields one sequence, say, A; for the B sequence, the film is rewound and run through the camera starting at a point intermediate two "A" frames. Alternatively, film 10 can be produced as a print by merging two separate films each carrying one of the desired sequences; this can be accomplished using standard processing techniques modified in a manner analogous to the camera.

As mentioned hereinabove, the production of film for use in the VAMP simulator visual system involves photographing the scene appearing through the windshield of an aircraft flying a planned mission including, primarily, the making of a normal landing and take-off on as perfect as possible a flight profile. Following this procedure, the A motion picture sequence can be recorded. Thereafter, the film having been rewound to the starting point and positioned with a B frame in the film gate, the aircraft flies a second mission over a different flight path. The flight path followed in the second mission depends on the nature of the desired deviation from the A sequence. As already explained, conventional film-based visual systems are pre-programmed and, therefore, it would not be possible to simulate a rejected landing, for example. If this is the deviation desired from the A sequence, the B sequence is photographed while the aircraft rejects a landing at the same airport and runway used for the A sequence. The B sequence can also record an aborted take-off or show the simulated aircraft perhaps veering off to one side or the other due to improper control during a cross-wind landing or take-off.

Figure 2:
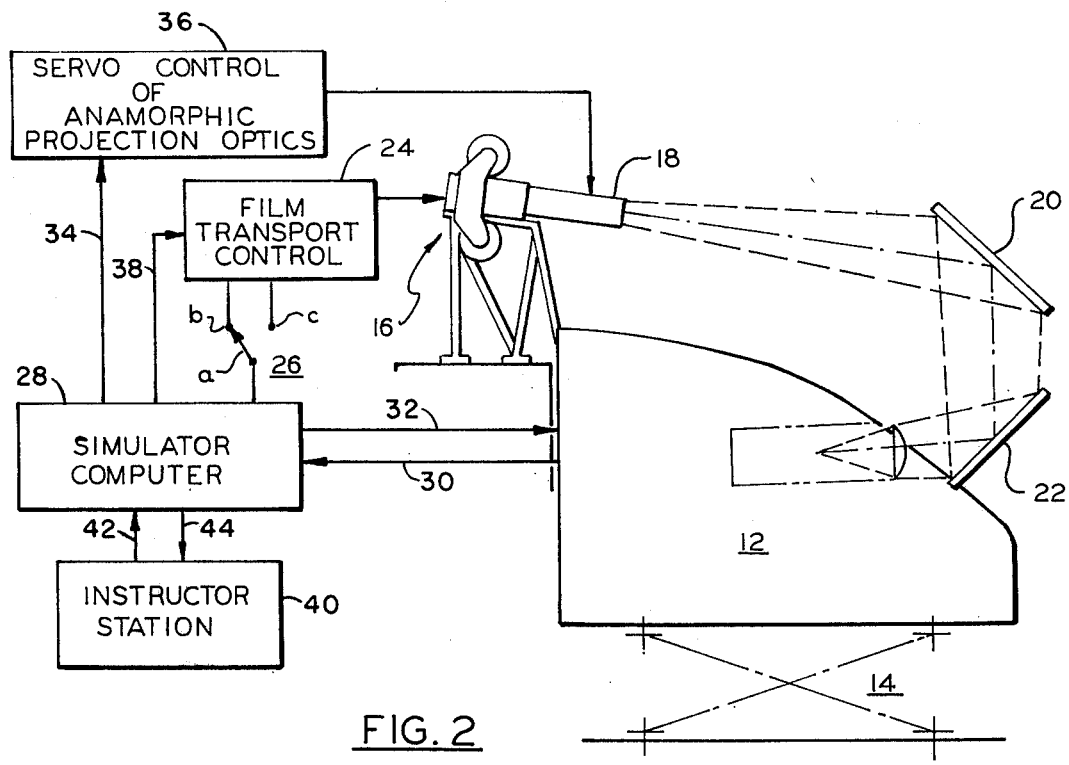
FIG. 2 is a diagrammatic view of an aircraft simulator with a visual system embodying the invention.

The film thus obtained can be used in an aircraft simulator such as diagrammatically shown in FIG. 2 to achieve a flexibility heretobefore unknown in a film-based visual system. Due to the complexity of modern flight simulators, all non-essential detail has been omitted in the interest of clarity from FIG. 2 wherein the student station or cockpit is designated 12 and shown mounted on a motion platform 14. Atop the cockpit is mounted a projector 16 having a variable anamorphic lens system 18 adjustable to achieve apparent viewpoint displacement as described in the aforementioned Hemstreet patent. Omitting for simplicity the infinity imaging system normally employed, the projected image is reflected by mirrors 20 and 22 to the simulator pilot in cockpit 12.

The film transport system (not shown) of projector 16 is of the type fully described in the aforementioned Butler patent and accordingly is capable of variable pull-down. The pull-down control is shown symbolically by means of rectangle 24 and a selector switch 26 comprising movable contact a and two stationary contacts b and c representing single and double frame advance increments. While a mechanical selector switch is shown for ease of description it will be appreciated that relays or solid state switching would normally be employed.

Pull-down selector switch 26 is under control of a simulator computer 28 which may be an appropriately programmed general purpose digital machine or one specifically adapted for simulation applications as shown in U.S. Pat. No. 3,363,331 to J. M. Hunt. In a manner well-known in the art computer 28 receives as inputs, represented en masse by arrow 30, signals representing the displacements of simulated controls (not shown) by the trainee in cockpit 12 as well as feedback signals representing instrument readings, cockpit position and movement of the motion system, etc. Arrow 30 represents what is often referred to as a "linkage" and it includes provision for analog to digital conversion of signals as necessary. In response to the input signals through linkage 30, computer 28 supplies appropriate output signals via a linkage 32 (with D to A conversion as necessary) to simulator cockpit 12 to drive instruments and indicators, control motion system 14, etc.

As shown by arrow 34, computer 28 also controls a servo system 36 and, thereby, anamorphic lens 18, and as shown by arrow 38, regulates the speed of projector 16. An instructor's station 40 is linked to the simulator via computer 28 as indicated by arrows 42 and 44 to permit the instructor to control certain flight conditions, create malfunctions, and monitor trainee performance.

Except for the variability of the projector pull-down, all of the structure shown in FIG. 2 and thus far described, as well as the simulation program executed by computer 28, are conventional and well-known in the art.

Assuming projector 16 is loaded with film carrying two motion picture sequences A and B as described with reference to FIG. 1, A depicting a normal take-off and B an aborted take-off due to engine failure: with the film positioned initially to project sequence A and the pull-down selector set to a double frame advance, the trainee advances the simulated throttle to start the take-off run. The throttle advance signal to the computer causes the computer to drive the engine speed indicators (for example) to the RPM reading appropriate to the throttle setting; cause other dials and gages to respond appropriately; and starts projector 16, gradually increasing its speed as necessary.

At some point during the take-off run, the instructor inserts a malfunction in one engine. (The timing of the malfunction and its relation to the film will be discussed presently). Observing the instrument indications, the trainee diagnoses the malfunction. If it is sufficiently serious to justify abortion of the take-off (and assuming the point of no return has not been passed) the trainee closes throttles, reverses thrust, applies brakes, etc. In response to one of these actions (that peculiarly typical of a take-off refusal under the circumstances) the computer causes the projector to switch momentarily from double to single frame advance. Ideally this switching should be such as to produce but a single one frame advance followed by resumption of the double frame advance. However, an odd number of one-frame advances may be acceptable as will become apparent as this description continues.

With the one frame advance, film 10 is shifted from the A to the B sequence so that, instead of the scene presented to the pilot being that typical of a normal take-off, it will reflect the aircraft's failure to become airborne and its continuance and deceleration on the runway.

From the foregoing, the necessary correlation between sequence A and sequence B will become apparent. Obviously, the transition from A to B must be made at a time when there is not a gross disparity in the frame content. Thus, for example, if the pilot continued the take-off until airborne at 20 or 30 feet of altitude and then closed the throttles (not a logical action) one of two things would occur depending on the programming of the computer. If permitted by the programming, the film would be shifted to the B sequence, whereupon the visual display would reflect a sudden drop to the runway in taxiing position, or the film would continue on sequence A so that insofar as the visual display is concerned the simulated aircraft would continue to gain altitude and climb out as in a normal take-off. Both alternatives obviously are totally unrealistic but as a practical matter can be avoided by proper design of the film sequences, and the simulation program and/or control of the shifting points either by the computer or instructor action.

Considering first the film design, ideally there should be a run of film at a judicious location (i.e., where shifting would occur) where the corresponding A and B frames are practically identical. However, in actual practice this ideal would be difficult to achieve and a considerable disparity is tolerable because it can be compensated for by use of the anamorphic optics so as to "interpolate" between A and B sequences as described in the above-mentioned U.S. Pat. No. 3,580,978 to Ebeling. Briefly stated, under the control of computer 28 and the servo system 36, anamorphic lens system 18 would be adjusted to distort the projected image in a manner calculated to minimize disparity of the A and B frames in the shifting region.

As for timing, the malfunction would be inserted by the instructor at a propitious time or action to implement the insertion delayed by the computer until such time as the shift can be accommodated without loss of continuity. In this connection, the various constraints imposed by the expectation of rational actions and reactions by the trainee mitigate the problem of the shifting points. Thus, reverting to the above-stated example, it would only be necessary to cope with the interpolation between sequences at segments of the film where a rational choice is available to the trainee. If he took some irrational action such as closing the throttles while just airborne at the end of the runway, the film presentation could be suspended in favor of an appropriate crash indication.

Figure 3:
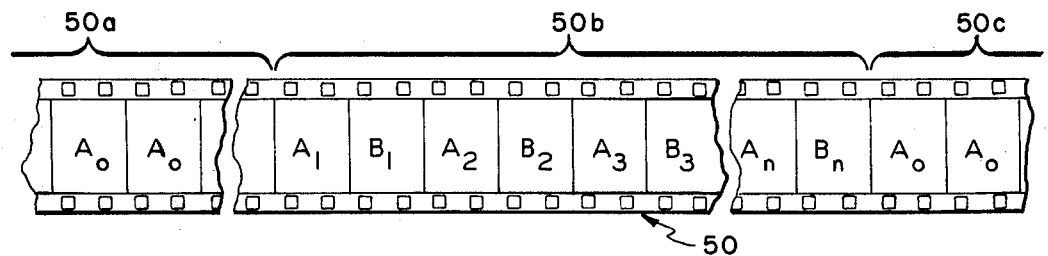
FIG. 3 is an alternate configuration of the film shown in FIG. 1.

As a matter of fact, in the interests of conserving film footage it would be undesirable to run the entire film at a double frame advance so that the film used in practice normally would take the form shown as 50 in FIG. 3. It will be noted that the central portion 50b of the film 50 is identical to film strip 10 of FIG. 1. Preceding and following segment 50b are segments 50a and 50c (which might constitute major portions of the film) with frames designated $A_o$. Segments so designated carry only one sequence and are projected with the transport operating in a single frame mode and programmed to shift into the double frame mode when the $A_1$ frame enters the film gate. The shift can be effected either by use of optical or magnetic coding of the film in conjunction with appropriate sensors or by generating an absolutely accurate frame count as described in co-pending application Ser. No. 210,444 filed Dec. 21, 1971 in the name of C. R. Maggi or Ser. No. 226,434 filed Feb. 15, 1972 in the name of Philip G. Barboni, both of which are assigned to the same assignee as the present invention.

While the invention has been described in relation to film carrying two sequences, at least three sequences can be used. This would involve using a triple frame advance for any given sequence with a single or double advance used to shift to one or the other of the two alternate sequences.

Another application of the invention is in connection with automobile simulators or "driver trainers" such as shown in U.S. Pat. Nos. 3,266,173 and 3,266,174. In such an application, one motion picture sequence can depict vehicle operation in one lane of a multi-lane highway and second and/or third sequences operation in adjacent lanes. Switching of the film sequences would be in response to action taken by the trainee in connection with or preparation for a lane change.

Although the invention has been shown and described with respect to a preferred embodiment thereof, it should be understood by those skilled in the art that various changes and omissions in the form and detail thereof may be made therein without departing from the spirit and the scope of the invention.

What is claimed and desired to be protected by U.S. Letters Patent is:

1. A visual simulation system for vehicle trainers comprising, in combination:
    a student station having simulated controls appropriate to the vehicle for providing output signals representative of the actuation of said simulated controls;
    a cine film strip carrying a first motion picture sequence recorded on selected frames uniformly spaced from each other by at least one intermediate frame and a second motion picture sequence recorded on intermediate frames spaced from one another by the same number of frames as said selected frames;
    a cine projector for displaying said cine film strip including film transport means adjustable to advance said cine film in increments of a single or multiple frames at a time; and
    means responsive to selected ones of said output signals for selectively adjusting the film transport means to change momentarily between single and multiple frame film advance during operation of the projector so that a selection can be made as to which of the motion picture sequences is displayed.

2. The visual simulation system according to claim 1 wherein said cine film strip includes a segment on which a continuance of one of said motion picture sequences is recorded on consecutive frames.

3. The visual simulation system according to claim 2 wherein said cine film strip includes two such segments, on preceding and one following the portion of the strip carrying both the first and second motion picture sequences.

4. A visual simulation system for vehicle trainers comprising, in combination:
    a student station having simulated controls appropriate to the vehicle;
    a cine film strip carrying a first motion picture sequence recorded on selected frames uniformly spaced from each other by at least one intermediate frame and a second motion picture sequence recorded on intermediate frames spaced from one another by the same number of frames as said selected frames;
    a visual display including a cine projector for presenting to an occupant of the student station a cinematographic visual representation of an environment appropriate to the vehicle, said projector including film transport means adjustable to advance said cine film in single or multiple frame increments and normally advancing the film in uniform multiple frame increments;
    computational means responsive to input signals provided by said simulated controls for providing output signals representative of particular manipulations of said controls by a trainee; and
    means responsive to said output signals to adjust said transport means momentarily to effect an odd number of single-frame film advance increments while the film transport is operating and thereafter to return said transport means to its normal, multiple-frame advance mode so that a selection can be made as to which of the motion picture sequences is displayed.

5. A visual simulation system according to claim 4 including a variable anamorphic optical system under the control of said computation means for changing the apparent perspective with which images are displayed by said projector.

* * * * *